(12) United States Patent
Gokhale et al.

(10) Patent No.: US 10,762,036 B2
(45) Date of Patent: *Sep. 1, 2020

(54) ARCHIVING DATA OBJECTS USING SECONDARY COPIES

(71) Applicant: Commvault Systems, Inc., Tinton Falls, NJ (US)

(72) Inventors: Parag Gokhale, Marlboro, NJ (US); Rajiv Kottomtharayil, Marlboro, NJ (US); Prakash Varadharajan, Manalapan, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/476,613

(22) Filed: Mar. 31, 2017

(65) Prior Publication Data

US 2017/0206206 A1 Jul. 20, 2017

Related U.S. Application Data

(63) Continuation of application No. 15/013,138, filed on Feb. 2, 2016, now Pat. No. 9,639,563, which is a (Continued)

(51) Int. Cl.
*G06F 12/00* (2006.01)
*G06F 16/11* (2019.01)
(Continued)

(52) U.S. Cl.
CPC ........ *G06F 16/113* (2019.01); *G06F 11/1402* (2013.01); *G06F 11/1415* (2013.01);
(Continued)

(58) Field of Classification Search
CPC .......... G06F 11/1451; G06F 17/30466; G06F 17/30584; G06F 11/1402; G06F 11/1448; G06F 2201/84
See application file for complete search history.

(56) References Cited

U.S. PATENT DOCUMENTS 4,686,620 A 8/1987 Ng
4,713,755 A 12/1987 Worley, Jr. et al.
(Continued)

FOREIGN PATENT DOCUMENTS

EP 0259912 A1 3/1988
EP 0405926 A2 1/1991
(Continued)

OTHER PUBLICATIONS

U.S. Appl. No. 15/694,137 of Muller et al., filed Sep. 1, 2017.
(Continued)

*Primary Examiner* — Mark A Giardino, Jr
(74) *Attorney, Agent, or Firm* — Knobbe Martens Olson & Bear LLP

(57) ABSTRACT

A system for archiving data objects using secondary copies is disclosed. The system creates one or more secondary copies of primary copy data that contains multiple data objects. The system maintains a first data structure that tracks the data objects for which the system has created secondary copies and the locations of the secondary copies. To archive data objects in the primary copy data, the system identifies data objects to be archived, verifies that previously-created secondary copies of the identified data objects exist, and replaces the identified data objects with stubs. The system maintains a second data structure that both tracks the stubs and refers to the first data structure, thereby creating an association between the stubs and the locations of the secondary copies.

19 Claims, 5 Drawing Sheets

Related U.S. Application Data continuation of application No. 14/595,984, filed on Jan. 13, 2015, now Pat. No. 9,262,275, which is a continuation of application No. 13/250,824, filed on Sep. 30, 2011, now Pat. No. 8,935,492.

(60) Provisional application No. 61/388,566, filed on Sep. 30, 2010.

(51) Int. Cl.

| | | |
|---|---|---|
| *G06F 16/21* | | (2019.01) |
| *G06F 16/27* | | (2019.01) |
| *G06F 16/2453* | | (2019.01) |
| *G06F 11/14* | | (2006.01) |
| *G06F 13/00* | | (2006.01) |
| *G06F 13/28* | | (2006.01) |
| *G06F 3/06* | | (2006.01) |

(52) U.S. Cl.
CPC ........ *G06F 11/1451* (2013.01); *G06F 16/219* (2019.01); *G06F 16/24544* (2019.01); *G06F 16/278* (2019.01); *G06F 3/0641* (2013.01); *G06F 11/1448* (2013.01); *G06F 2201/84* (2013.01)

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,437,012 A | 7/1995 | Mahajan |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,604,862 A | 2/1997 | Midgely et al. |
| 5,606,686 A | 2/1997 | Tarui et al. |
| 5,619,644 A | 4/1997 | Crockett et al. |
| 5,628,004 A | 5/1997 | Gormley et al. |
| 5,634,052 A | 5/1997 | Morris |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,794,229 A | 8/1998 | French et al. |
| 5,806,057 A | 9/1998 | Gormley et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,822,780 A | 10/1998 | Schutzman |
| 5,862,325 A * | 1/1999 | Reed ................ H04L 29/06 704/270.1 |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,073,133 A | 6/2000 | Chrabaszcz |
| 6,076,148 A | 6/2000 | Kedem |
| 6,094,416 A | 7/2000 | Ying |
| 6,125,369 A | 9/2000 | Wu et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,173,291 B1 | 1/2001 | Jenevein |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,252 B1 | 10/2001 | Raz |
| 6,324,544 B1 | 11/2001 | Alam et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,356,915 B1 | 3/2002 | Chtchetkine et al. |
| 6,363,400 B1 | 3/2002 | Chtchetkine et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,477,544 B1 | 11/2002 | Bolosky et al. |
| 6,487,561 B1 | 11/2002 | Ofek et al. |
| 6,513,051 B1 | 1/2003 | Bolosky et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,609,157 B2 | 8/2003 | Deo et al. |
| 6,609,183 B2 | 8/2003 | Ohran |
| 6,609,187 B1 | 8/2003 | Merrell et al. |
| 6,658,526 B2 | 12/2003 | Nguyen et al. |
| 6,675,177 B1 | 1/2004 | Webb |
| 6,704,730 B2 | 3/2004 | Moulton et al. |
| 6,708,195 B1 | 3/2004 | Borman et al. |
| 6,745,304 B2 | 6/2004 | Playe |
| 6,757,699 B2 | 6/2004 | Lowry |
| 6,757,794 B2 | 6/2004 | Cabrera et al. |
| 6,795,903 B2 | 9/2004 | Schultz et al. |
| 6,810,398 B2 | 10/2004 | Moulton |
| 6,839,819 B2 | 1/2005 | Martin |
| 6,862,674 B2 | 3/2005 | Dice et al. |
| 6,865,655 B1 | 3/2005 | Andersen |
| 6,868,417 B2 | 3/2005 | Kazar et al. |
| 6,889,297 B2 | 5/2005 | Krapp et al. |
| 6,901,493 B1 | 5/2005 | Maffezzoni |
| 6,912,645 B2 | 6/2005 | Dorward et al. |
| 6,928,459 B1 | 8/2005 | Sawdon et al. |
| 6,952,758 B2 | 10/2005 | Chron et al. |
| 6,959,368 B1 | 10/2005 | St. Pierre et al. |
| 6,973,553 B1 | 12/2005 | Archibald, Jr. et al. |
| 6,976,039 B2 | 12/2005 | Chefalas et al. |
| 7,017,113 B2 | 3/2006 | Bourbakis et al. |
| 7,035,876 B2 | 4/2006 | Kawai et al. |
| 7,035,880 B1 * | 4/2006 | Crescenti ............ G06F 11/1464 |
| 7,035,943 B2 | 4/2006 | Yamane et al. |
| 7,085,904 B2 | 8/2006 | Mizuno et al. |

(56) References Cited

U.S. PATENT DOCUMENTS

| | | |
|---|---|---|
| 7,089,383 B2 | 8/2006 | Ji et al. |
| 7,089,395 B2 | 8/2006 | Jacobson et al. |
| 7,092,956 B2 | 8/2006 | Ruediger |
| 7,103,740 B1 | 9/2006 | Colgrove et al. |
| 7,107,418 B2 | 9/2006 | Ohran |
| 7,111,173 B1 | 9/2006 | Scheidt |
| 7,117,246 B2 | 10/2006 | Christenson et al. |
| 7,139,808 B2 | 11/2006 | Anderson et al. |
| 7,143,091 B2 | 11/2006 | Charnock et al. |
| 7,143,108 B1 | 11/2006 | George |
| 7,191,290 B1 | 3/2007 | Ackaouy et al. |
| 7,200,604 B2 | 4/2007 | Forman et al. |
| 7,200,621 B2 | 4/2007 | Beck et al. |
| 7,246,272 B2 | 7/2007 | Cabezas et al. |
| 7,272,606 B2 | 9/2007 | Borthakur et al. |
| 7,287,252 B2 | 10/2007 | Bussiere et al. |
| 7,290,102 B2 | 10/2007 | Lubbers et al. |
| 7,310,655 B2 | 12/2007 | Dussud |
| 7,320,059 B1 | 1/2008 | Armangau et al. |
| 7,325,110 B2 | 1/2008 | Kubo et al. |
| 7,330,997 B1 | 2/2008 | Odom |
| 7,343,459 B2 | 3/2008 | Prahlad et al. |
| 7,370,003 B2 | 5/2008 | Pych |
| 7,376,805 B2 | 5/2008 | Stroberger et al. |
| 7,383,304 B2 | 6/2008 | Shimada et al. |
| 7,383,462 B2 | 6/2008 | Osaki et al. |
| 7,389,345 B1 | 6/2008 | Adams |
| 7,395,282 B1 | 7/2008 | Crescenti et al. |
| 7,403,942 B1 | 7/2008 | Bayliss |
| 7,409,522 B1 | 8/2008 | Fair et al. |
| 7,444,382 B2 | 10/2008 | Malik |
| 7,444,387 B2 | 10/2008 | Douceur et al. |
| 7,451,166 B2 | 11/2008 | Damani et al. |
| 7,478,096 B2 | 1/2009 | Margolus et al. |
| 7,478,113 B1 | 1/2009 | De Spiegeleer et al. |
| 7,480,782 B2 | 1/2009 | Garthwaite |
| 7,487,245 B2 | 2/2009 | Douceur et al. |
| 7,490,207 B2 | 2/2009 | Amarendran et al. |
| 7,493,314 B2 | 2/2009 | Huang et al. |
| 7,493,456 B2 | 2/2009 | Brittain et al. |
| 7,496,604 B2 | 2/2009 | Sutton, Jr. et al. |
| 7,512,745 B2 | 3/2009 | Gschwind et al. |
| 7,519,726 B2 | 4/2009 | Palliyil et al. |
| 7,533,331 B2 | 5/2009 | Brown et al. |
| 7,536,440 B2 | 5/2009 | Budd et al. |
| 7,568,080 B2 | 7/2009 | Prahlad et al. |
| 7,577,687 B2 | 8/2009 | Bank et al. |
| 7,603,529 B1 | 10/2009 | MacHardy et al. |
| 7,613,748 B2 | 11/2009 | Brockway et al. |
| 7,617,297 B2 | 11/2009 | Bruce et al. |
| 7,631,120 B2 | 12/2009 | Darcy |
| 7,631,194 B2 | 12/2009 | Wahlert et al. |
| 7,636,824 B1 | 12/2009 | Tormasov |
| 7,647,462 B2 | 1/2010 | Wolfgang et al. |
| 7,657,550 B2 | 2/2010 | Prahlad et al. |
| 7,661,028 B2 | 2/2010 | Erofeev |
| 7,668,884 B2 | 2/2010 | Prahlad et al. |
| 7,672,779 B2 | 3/2010 | Fuchs |
| 7,672,981 B1 | 3/2010 | Faibish et al. |
| 7,673,089 B2 | 3/2010 | Hinchey |
| 7,676,590 B2 | 3/2010 | Silverman et al. |
| 7,685,126 B2 | 3/2010 | Patel et al. |
| 7,685,177 B1 | 3/2010 | Hagerstrom et al. |
| 7,685,384 B2 | 3/2010 | Shavit |
| 7,685,459 B1 | 3/2010 | De Spiegeleer et al. |
| 7,698,699 B2 | 4/2010 | Rogers et al. |
| 7,716,445 B2 | 5/2010 | Bonwick et al. |
| 7,721,292 B2 | 5/2010 | Frasier et al. |
| 7,734,581 B2 | 6/2010 | Gu et al. |
| 7,747,579 B2 | 6/2010 | Prahlad et al. |
| 7,747,584 B1 | 6/2010 | Jernigan, IV |
| 7,747,659 B2 | 6/2010 | Bacon et al. |
| 7,778,979 B2 | 8/2010 | Hatonen et al. |
| 7,786,881 B2 | 8/2010 | Burchard et al. |
| 7,788,230 B2 | 8/2010 | Dile et al. |
| 7,814,142 B2 | 10/2010 | Mamou et al. |
| 7,818,287 B2 | 10/2010 | Torii et al. |
| 7,818,495 B2 | 10/2010 | Tanaka et al. |
| 7,818,531 B2 | 10/2010 | Barrall |
| 7,830,889 B1 | 11/2010 | Lemaire et al. |
| 7,831,707 B2 | 11/2010 | Bardsley |
| 7,831,793 B2 | 11/2010 | Chakravarty et al. |
| 7,831,795 B2 | 11/2010 | Prahlad et al. |
| 7,836,161 B2 | 11/2010 | Scheid |
| 7,840,537 B2 | 11/2010 | Gokhale et al. |
| 7,853,750 B2 | 12/2010 | Stager |
| 7,856,414 B2 | 12/2010 | Zee |
| 7,865,678 B2 | 1/2011 | Arakawa et al. |
| 7,870,105 B2 | 1/2011 | Arakawa et al. |
| 7,870,486 B2 | 1/2011 | Wang et al. |
| 7,873,599 B2 | 1/2011 | Ishii et al. |
| 7,873,806 B2 | 1/2011 | Prahlad et al. |
| 7,882,077 B2 | 2/2011 | Gokhale et al. |
| 7,899,990 B2 | 3/2011 | Moll et al. |
| 7,921,077 B2 | 4/2011 | Ting et al. |
| 7,953,706 B2 | 5/2011 | Prahlad et al. |
| 7,962,452 B2 | 6/2011 | Anglin |
| 8,028,106 B2 | 9/2011 | Bondurant et al. |
| 8,037,028 B2 | 10/2011 | Prahlad et al. |
| 8,041,907 B1 | 10/2011 | Wu et al. |
| 8,051,367 B2 | 11/2011 | Arai et al. |
| 8,054,765 B2 | 11/2011 | Passey et al. |
| 8,055,618 B2 | 11/2011 | Anglin |
| 8,055,627 B2 * | 11/2011 | Prahlad ............ G06F 17/30067 707/661 |
| 8,055,745 B2 | 11/2011 | Atluri |
| 8,078,603 B1 | 12/2011 | Chandratillake et al. |
| 8,086,799 B2 | 12/2011 | Mondal et al. |
| 8,095,756 B1 | 1/2012 | Somavarapu et al. |
| 8,108,429 B2 | 1/2012 | Sim-Tang et al. |
| 8,112,357 B2 | 2/2012 | Mueller et al. |
| 8,131,687 B2 | 3/2012 | Bates et al. |
| 8,140,786 B2 | 3/2012 | Bunte et al. |
| 8,156,092 B2 | 4/2012 | Hewett et al. |
| 8,156,279 B2 | 4/2012 | Tanaka et al. |
| 8,161,003 B2 | 4/2012 | Kavuri |
| 8,165,221 B2 | 4/2012 | Zheng et al. |
| 8,166,263 B2 | 4/2012 | Prahlad et al. |
| 8,170,994 B2 | 5/2012 | Tsaur et al. |
| 8,190,823 B2 | 5/2012 | Waltermann et al. |
| 8,190,835 B1 | 5/2012 | Yueh |
| 8,213,540 B1 | 7/2012 | Lee et al. |
| 8,219,524 B2 | 7/2012 | Gokhale |
| 8,234,444 B2 | 7/2012 | Bates et al. |
| 8,239,348 B1 | 8/2012 | Bezbaruah et al. |
| 8,244,914 B1 | 8/2012 | Nagarkar |
| 8,271,992 B2 | 9/2012 | Chatley et al. |
| 8,285,683 B2 | 10/2012 | Prahlad et al. |
| 8,295,875 B2 | 10/2012 | Masuda |
| 8,296,260 B2 | 10/2012 | Ting et al. |
| 8,315,984 B2 | 11/2012 | Frandzel |
| 8,346,730 B2 | 1/2013 | Srinivasan et al. |
| 8,375,008 B1 | 2/2013 | Gomes |
| 8,380,957 B2 | 2/2013 | Prahlad et al. |
| 8,386,436 B2 | 2/2013 | Ben-Dyke et al. |
| 8,392,677 B2 | 3/2013 | Bunte et al. |
| 8,401,996 B2 | 3/2013 | Muller et al. |
| 8,412,677 B2 | 4/2013 | Klose |
| 8,412,682 B2 | 4/2013 | Zheng et al. |
| 8,548,953 B2 | 10/2013 | Wong et al. |
| 8,578,120 B2 | 11/2013 | Attarde et al. |
| 8,620,845 B2 | 12/2013 | Stoakes et al. |
| 8,626,723 B2 | 1/2014 | Ben-Shaul et al. |
| 8,712,969 B2 | 4/2014 | Prahlad et al. |
| 8,712,974 B2 | 4/2014 | Datuashvili et al. |
| 8,725,687 B2 | 5/2014 | Klose |
| 8,769,185 B2 | 7/2014 | Chung |
| 8,782,368 B2 | 7/2014 | Lillibridge et al. |
| 8,880,797 B2 | 11/2014 | Yueh |
| 8,909,881 B2 | 12/2014 | Bunte et al. |
| 8,935,492 B2 | 1/2015 | Gokhale et al. |
| 8,965,852 B2 | 2/2015 | Jayaraman |
| 8,997,020 B2 | 3/2015 | Chambers et al. |
| 9,015,181 B2 | 4/2015 | Kottomtharayil et al. |

(56) References Cited

U.S. PATENT DOCUMENTS

| | | |
|---|---|---|
| 9,020,890 B2 | 4/2015 | Kottomtharayil et al. |
| 9,058,117 B2 | 6/2015 | Attarde et al. |
| 9,236,079 B2 | 1/2016 | Prahlad et al. |
| 9,262,275 B2 | 2/2016 | Gokhale et al. |
| 9,633,022 B2 | 4/2017 | Vijayan |
| 9,639,563 B2 | 5/2017 | Gokhale et al. |
| 9,646,166 B2 | 5/2017 | Cash et al. |
| 9,773,025 B2 | 9/2017 | Muller et al. |
| 2001/0037323 A1 | 11/2001 | Moulton et al. |
| 2002/0055972 A1 | 5/2002 | Weinman |
| 2002/0065892 A1 | 5/2002 | Malik |
| 2002/0099806 A1 | 7/2002 | Balsamo et al. |
| 2002/0107877 A1 | 8/2002 | Whiting et al. |
| 2003/0004922 A1 | 1/2003 | Schmidt et al. |
| 2003/0074600 A1 | 4/2003 | Tamatsu |
| 2003/0110190 A1 | 6/2003 | Achiwa et al. |
| 2003/0167318 A1 | 9/2003 | Robbin et al. |
| 2003/0172368 A1 | 9/2003 | Alumbaugh et al. |
| 2003/0177149 A1 | 9/2003 | Coombs |
| 2003/0236763 A1 | 12/2003 | Kilduff |
| 2004/0148306 A1 | 7/2004 | Moulton et al. |
| 2004/0177319 A1* | 9/2004 | Horn .................. G06F 17/3002 715/205 |
| 2004/0220975 A1 | 11/2004 | Carpentier et al. |
| 2004/0230817 A1 | 11/2004 | Ma |
| 2005/0033756 A1 | 2/2005 | Kottomtharayil et al. |
| 2005/0060643 A1 | 3/2005 | Glass et al. |
| 2005/0066190 A1 | 3/2005 | Martin |
| 2005/0097150 A1 | 5/2005 | McKeon et al. |
| 2005/0131961 A1 | 6/2005 | Margolus et al. |
| 2005/0138081 A1 | 6/2005 | Alshab et al. |
| 2005/0195660 A1 | 9/2005 | Kavuri et al. |
| 2005/0203864 A1 | 9/2005 | Schmidt et al. |
| 2005/0203887 A1 | 9/2005 | Joshi et al. |
| 2005/0210460 A1 | 9/2005 | Rogers et al. |
| 2005/0234823 A1 | 10/2005 | Schimpf |
| 2005/0254072 A1 | 11/2005 | Hirai et al. |
| 2005/0262193 A1 | 11/2005 | Mamou et al. |
| 2005/0283461 A1 | 12/2005 | Sell et al. |
| 2005/0286466 A1 | 12/2005 | Tagg et al. |
| 2006/0005048 A1 | 1/2006 | Osaki et al. |
| 2006/0010227 A1 | 1/2006 | Atluri |
| 2006/0047894 A1 | 3/2006 | Okumura |
| 2006/0047978 A1 | 3/2006 | Kawakami et al. |
| 2006/0053305 A1 | 3/2006 | Wahlert et al. |
| 2006/0056623 A1 | 3/2006 | Gligor et al. |
| 2006/0089954 A1 | 4/2006 | Anschutz |
| 2006/0095470 A1 | 5/2006 | Cochran et al. |
| 2006/0126615 A1 | 6/2006 | Angtin et al. |
| 2006/0129576 A1 | 6/2006 | Carpentier et al. |
| 2006/0174112 A1 | 8/2006 | Wray |
| 2006/0206547 A1 | 9/2006 | Kulkarni et al. |
| 2006/0224846 A1 | 10/2006 | Amarendran et al. |
| 2006/0230081 A1 | 10/2006 | Craswell et al. |
| 2006/0230244 A1* | 10/2006 | Amarendran ......... G06F 3/0619 711/162 |
| 2006/0259587 A1 | 11/2006 | Ackerman et al. |
| 2007/0022145 A1 | 1/2007 | Kavuri |
| 2007/0106863 A1 | 5/2007 | Bonwick et al. |
| 2007/0118573 A1 | 5/2007 | Gadiraju |
| 2007/0136200 A1 | 6/2007 | Frank et al. |
| 2007/0156998 A1 | 7/2007 | Gorobets |
| 2007/0179995 A1 | 8/2007 | Prahlad et al. |
| 2007/0271316 A1 | 11/2007 | Hollebeek |
| 2007/0288534 A1 | 12/2007 | Zak et al. |
| 2008/0047935 A1 | 2/2008 | Schmidt |
| 2008/0082714 A1 | 4/2008 | Hinchey |
| 2008/0082736 A1 | 4/2008 | Chow et al. |
| 2008/0098083 A1 | 4/2008 | Shergill et al. |
| 2008/0104291 A1 | 5/2008 | Hinchey |
| 2008/0126543 A1 | 5/2008 | Hamada et al. |
| 2008/0162518 A1 | 7/2008 | Bollinger et al. |
| 2008/0229037 A1 | 9/2008 | Bunte et al. |
| 2008/0243769 A1 | 10/2008 | Arbour et al. |
| 2008/0243914 A1 | 10/2008 | Prahlad et al. |
| 2008/0244172 A1 | 10/2008 | Kano |
| 2008/0244204 A1 | 10/2008 | Cremelie et al. |
| 2008/0307000 A1 | 12/2008 | Paterson et al. |
| 2009/0012984 A1 | 1/2009 | Ravid et al. |
| 2009/0049260 A1 | 2/2009 | Upadhyayula |
| 2009/0083341 A1 | 3/2009 | Parees et al. |
| 2009/0083344 A1 | 3/2009 | Inoue et al. |
| 2009/0106369 A1 | 4/2009 | Chen et al. |
| 2009/0112870 A1 | 4/2009 | Ozzie et al. |
| 2009/0119678 A1 | 5/2009 | Shih et al. |
| 2009/0150498 A1 | 6/2009 | Branda et al. |
| 2009/0204636 A1 | 8/2009 | Li et al. |
| 2009/0204650 A1 | 8/2009 | Wong et al. |
| 2009/0268903 A1 | 10/2009 | Bojinov et al. |
| 2009/0271454 A1 | 10/2009 | Anglin et al. |
| 2009/0281847 A1 | 11/2009 | Hamilton, II et al. |
| 2009/0319534 A1 | 12/2009 | Gokhale |
| 2010/0036887 A1 | 2/2010 | Anglin et al. |
| 2010/0082529 A1 | 4/2010 | Mace et al. |
| 2010/0082672 A1 | 4/2010 | Kottomtharayil et al. |
| 2010/0088296 A1 | 4/2010 | Periyagaram et al. |
| 2010/0281081 A1 | 11/2010 | Stager et al. |
| 2010/0332401 A1 | 12/2010 | Prahlad et al. |
| 2011/0125711 A1 | 5/2011 | Meisenheimer et al. |
| 2012/0159098 A1 | 6/2012 | Cheung et al. |
| 2012/0233417 A1 | 9/2012 | Kalach et al. |
| 2012/0271793 A1 | 10/2012 | Gokhale |
| 2013/0041872 A1 | 2/2013 | Aizman et al. |
| 2013/0086007 A1 | 4/2013 | Bandopadhyay |
| 2013/0117305 A1 | 5/2013 | Varakin et al. |
| 2014/0129961 A1 | 5/2014 | Zubarev et al. |
| 2014/0250088 A1 | 9/2014 | Klose |
| 2015/0199242 A1 | 7/2015 | Attarde et al. |
| 2015/0205678 A1 | 7/2015 | Kottomtharayil et al. |
| 2015/0205817 A1 | 7/2015 | Kottomtharayil et al. |
| 2015/0212889 A1 | 7/2015 | Amarendran et al. |
| 2016/0124658 A1 | 5/2016 | Prahlad et al. |
| 2016/0179435 A1 | 6/2016 | Haley et al. |
| 2016/0342633 A1 | 11/2016 | Senthilnathan et al. |
| 2016/0342661 A1 | 11/2016 | Kumarasamy et al. |
| 2017/0083408 A1 | 3/2017 | Vijayan |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |
| WO | WO-03027891 A1 | 4/2003 |
| WO | WO-2006052872 A2 | 5/2006 |
| WO | WO-2008070688 | 6/2008 |
| WO | WO-2008080140 A2 | 7/2008 |

OTHER PUBLICATIONS

Anonymous, "NTFS Sparse Files (NTFS5 Only)", Jun. 4, 2002, pp. 1-1, https://web.archive.org/web/20020604013016/http://ntfs.com/ntfs-sparse.htm.

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Commvault Systems, Inc., "Continuous Data Replicator 7.0," Product Data Sheet, 2007, 6 pages.

CommVault Systems, Inc., "Deduplication—How To,"; <http://documentation.commvault.com/commvault/release_8_0_0/books_

(56) References Cited

OTHER PUBLICATIONS online_1/english_US;/features/single_instance/single_instance_how_to.htm>, earliest known publication date:; Jan. 26, 2009, 7 pages.
CommVault Systems, Inc., "Deduplication,"; <http://documentation.commvault.com/commvault/release_8_0_0/books_online_1/english_US;/features/single_instance/single_instance.htm>, earliest known publication date: Jan. 26, 2009, 9; pages.
Diligent Technologies "HyperFactor," <http://www.diligent.com/products:protecTIER-1:HyperFactor-1>, Internet accessed on Dec. 5, 2008, 2 pages.
Eitel, "Backup and Storage Management in Distributed Heterogeneous Environments," *IEEE*, Jun. 12-16, 1994, pp. 124-126.
Enterprise Storage Management, "What Is Hierarchical Storage Management?", Jun. 19, 2005, pp. 1, http://web.archive.org/web/20050619000521/hhttp://www.enterprisestoragemanagement.com/faq/hierarchical-storage-management-shtml.
Enterprise Storage Management, What Is a Incremental Backup?, Oct. 26, 2005, pp. 1-2, http://web.archive.org/web/w0051026010908/http://www.enterprisestoragemanagement.com/faq/incremental-backup.shtml.
Extended European Search Report for 09816825.5; dated Oct. 27, 2015, 15 pages.
Extended European Search Report for EP07865192.4; dated May 2, 2013, 7 pages.
Federal Information Processing Standards Publication 180-2, "Secure Hash Standard", Aug. 1, 2002, ; <http://csrc.nist.gov/publications/fips/fips1 80-2/fips 1 80-2withchangenotice. pdf>, 83 pages.
FlexHex, "NTFS Sparse Files for Programmers", Feb. 22, 2006, pp. 1-4, https://web.archive.org/web/20060222050807/http://www.flexhex.com/docs/articles/sparse-files.phtml.
Gait, J., "The Optical File Cabinet: A Random-Access File System for Write-Once Optical Disks," *IEEE Computer*, vol. 21, No. 6, pp. 11-22 (Jun. 1988).
Geer, D., "Reducing the Storage Burden Via Data Deduplication," IEEE, Computer Journal, vol. 41, Issue 12, Dec. 2008, pp. 15-17.
Handy, Jim, "The Cache Memory Book: The Authoritative Reference on Cache Design," Second Edition, 1998, pp. 64-67 and pp. 204-205.
International Preliminary Report on Patentability and Written Opinion for PCT/US2007/086421, dated Jun. 18, 2009, 8 pages.
International Preliminary Report on Patentability and Written Opinion for PCT/US2011/054378, dated Apr. 11, 2013, 5 pages.
International Search Report and Written Opinion for PCT/US07/86421, dated Apr. 18, 2008, 9 pages.
International Search Report for Application No. PCT/US09/58137, dated Dec. 23, 2009, 14 pages.
International Search Report for Application No. PCT/US10/34676, dated Nov. 29, 2010, 9 pages.
International Search Report for Application No. PCT/US11/54378, dated May 2, 2012, 8 pages.

Jander, M., "Launching Storage-Area Net," *Data Communications*, US, McGraw Hill, NY, vol. 27, No. 4 (Mar. 21, 1998), pp. 64-72.
Kornblum, Jesse, "Identifying Almost Identical Files Using Context Triggered Piecewise Hashing," www.sciencedirect.com, Digital Investigation 3S (2006), pp. S91-S97.
Kulkarni P. et al., "Redundancy elimination within large collections of files," Proceedings of the Usenix Annual Technical Conference, Jul. 2, 2004, pp. 59-72.
Lortu Software Development, "Kondar Technology-Deduplication," <http://www.lortu.com/en/deduplication.asp>, Internet accessed on Dec. 5, 2008, 3 pages.
Menezes et al., "Handbook of Applied Cryptography", CRC Press, 1996, <http://www.cacr.math.uwaterloo.ca/hac/aboutlchap9.pdf>, 64 pages.
Microsoft, "Computer Dictionary", p. 249, Fifth Edition, 2002, 3 pages.
Microsoft, "Computer Dictionary", pp. 142, 150, 192, and 538, Fifth Edition, 2002, 6 pages.
Microsoft, "Computer Dictionary," Fifth Edition, 2002, p. 220.
Overland Storage, "Data Deduplication," <http://www.overlandstorage.com/topics/data_deduplication.html>, Internet accessed on Dec. 5, 2008, 2 pages.
Partial Supplementary European Search Report in Application No. 09816825.5, dated Apr. 15, 2015, 6 pages.
Quantum Corporation, "Data De-Duplication Background: A Technical White Paper," May 2008, 13 pages.
Rosenblum et al., "The Design and Implementation of a Log-Structured File System," *Operating Systems Review SIGOPS*, vol. 25, No. 5, New York, US, pp. 1-15 (May 1991).
SearchStorage, "File System", Nov. 1998, <http://searchstorage.techtarget.com/definition/file-system>, 10 pages.
Sharif, A., "Cache Memory," Sep. 2005, http://searchstorage.techtarget.com/definition/cache-memory, pp. 1-26.
Webopedia, "Cache," Apr. 11, 2001, http://web.archive.org/web/20010411033304/http://www.webopedia.com/TERM/c/cache.html pp. 1-4.
Webopedia, "Data Duplication", Aug. 31, 2006, <http://web.archive.org/web/20060913030559/http://www.webopedia.com/TERMID/data_deduplication.html>, 2 pages.
Webopedia, "Folder", Aug. 9, 2002, <https://web.archive.org/web/20020809211001/http://www.webopedia.com/TERM/F/folder.html> pp. 1-2.
Webopedia, "Logical Drive", Aug. 13, 2004, pp. 1-2, https://web.archive.org/web/20040813033834/http://www.webopedia.com/TERM/L/logical_drive.html.
Webopedia, "LPAR", Aug. 8, 2002, pp. 1-2, https://web.archive.org/web/20020808140639/http://www.webopedia.com/TERM/L/LPAR.html.
Webopedia, "Metadata", Apr. 5, 2001, <https://web.archive.org/web/20010405235507/http://www.webopedia.com/TERM/M/metadata.html>, pp. 1-2.

\* cited by examiner

FIG. 4A — 122

| ID | Primary copy location | Secondary copy location | Deletion time |
|---|---|---|---|
| 00000010 | \\client1\data\Q42008.xls | F:\client1\Q42008.xls | |
| 00000012 | \\client1\data\video.mpg | F:\client1\video.mpg | 2010-06-25 12:44 |
| ... | | | |
| 00001008 | \\client1\data\newcharts.ppt | F:\client1\newcharts.ppt | |
| 00001009 | \\client1\data\old.doc | F:\client1\old.doc | |
| 00001010 | \\client1\data\test.mdb | F:\client1\test.mdb | 2010-07-10 20:58 |
| ... | | | |
| 00025681 | \\client1\data\Q42008.xls.stub | F:\client1\Q42008.xls.stub | |
| 00025682 | \\client1\data\old.doc.stub | F:\client1\old.doc.stub | |

Rows: 425a (header), 425b, 425c, 425d, 425e, 425f, 425g
Columns: 405, 410, 415, 420

FIG. 4B — 124

| ID | token |
|---|---|
| 00000010 | a16c24df |
| ... | |
| 00001009 | b2396d21 |

Rows: 465a, 465b
Columns: 455, 460

FIG. 4C — 126

| ID | Primary copy location |
|---|---|
| 00000010 | \\client1\data\Q42008.xls |
| ... | |
| 00001008 | \\client1\data\newcharts.ppt |
| 00001009 | \\client1\data\old.doc |
| ... | |
| 00025681 | \\client1\data\Q42008.xls.stub |
| 00025682 | \\client1\data\old.doc.stub |

Rows: 435a, 435b, 435c, 435d, 435e
Columns: 405, 410

ARCHIVING DATA OBJECTS USING SECONDARY COPIES

CROSS-REFERENCE TO RELATED APPLICATIONS

This application is a continuation of U.S. patent application Ser. No. 15/013,138, filed Feb. 2, 2016, now U.S. Pat. No. 9,639,563 entitled ARCHIVING DATA OBJECTS USING SECONDARY COPIES which is a continuation of U.S. patent application Ser. No. 14/595,984, filed Jan. 13, 2015, now U.S. Pat. No. 9,262,275, entitled ARCHIVING DATA OBJECTS USING SECONDARY COPIES which is a continuation of U.S. patent application Ser. No. 13/250,824, filed Sep. 30, 2011, now U.S. Pat. No. 8,935,492, entitled ARCHIVING DATA OBJECTS USING SECONDARY COPIES which claims the benefit of U.S. Patent Application No. 61/388,566, filed Sep. 30, 2010, entitled ARCHIVING DATA OBJECTS USING SECONDARY COPIES, each of which is hereby incorporated herein by reference in its entirety.

BACKGROUND

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example, to prevent loss of data in the event a problem occurred with the data stored in primary storage.

To protect primary copy data or for other purposes, such as regulatory compliance, secondary copies (alternatively referred to as "data protection copies") can be made. Examples of secondary copies include a backup copy, a snapshot copy, a hierarchical storage management ("HSM") copy, an archive copy, and other types of copies.

A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at an offsite location.

After an initial, full backup of a data set is performed, periodic, intermittent, or continuous incremental backup operations may be subsequently performed on the data set. Each incremental backup operation copies only the primary copy data that has changed since the last full or incremental backup of the data set was performed. In this way, even if the entire set of primary copy data that is backed up is large, the amount of data that must be transferred during each incremental backup operation may be significantly smaller, since only the changed data needs to be transferred to secondary storage. Combined, one or more full backup and subsequent incremental copies may be utilized together to periodically or intermittently create a synthetic full backup copy. More details regarding synthetic storage operations are found in commonly-assigned U.S. patent application Ser. No. 12/510,059, entitled "Snapshot Storage and Management System with Indexing and User Interface," filed Jul. 27, 2009, now U.S. Pat. No. 7,873,806, which is hereby incorporated herein in its entirety.

An archive copy is generally a copy of the primary copy data, but typically includes only a subset of the primary copy data that meets certain criteria and is usually stored in a format other than the native application format. For example, an archive copy might include only that data from the primary copy that is larger than a given size threshold or older than a given age threshold and that is stored in a backup format. Often, archive data is removed from the primary copy, and a stub is stored in the primary copy to indicate its new location. When a user requests access to the archive data that has been removed or migrated, systems use the stub to locate the data and often make recovery of the data appear transparent, even though the archive data may be stored at a location different from the remaining primary copy data.

Archive copies are typically created and tracked independently of other secondary copies, such as other backup copies. For example, to create a backup copy, the data storage system transfers a secondary copy of primary copy data to secondary storage and tracks the backup copy using a backup index separate from the archive index. To create an archive copy, a conventional data storage system transfers the primary copy data to be archived to secondary storage to create an archive copy, replaces the primary copy data with a stub, and tracks the archive copy using an archive index. Accordingly, the data storage system will transfer two separate times to secondary storage a primary copy data object that is both archived and backed-up.

Since each transfer consumes network and computing resources, the data storage system may not be able to devote such resources to other tasks. Moreover, the data storage system is required to devote resources to maintaining each separate index. In some cases, the archive index may be unaware of the other secondary copy and the other secondary index may be unaware of the archive copy, which may lead to further inefficiencies. Moreover, in some cases, in the event that an archive copy is moved or transferred (e.g., to another tier of secondary storage), the archive index may not be able to be updated to reflect the move or transfer. In such cases, the data storage system may be unable to use the stub to locate the archived data object.

Also, in conventional systems, archiving operations may require the transfer of large quantities of data during a single archive operation. For example, the retention criteria for an organization may specify that data objects more than two years old should be archived. On the first day of the organization's operation, it may be entirely unnecessary to archive any data, since the only data that exists at that point is newly created and thus ineligible for archiving. However, over the course of two years of operations, the organization may amass large quantities of data. Thus, when the first archive operation finally occurs, e.g., approximately two years into the operation of the organization, it may be necessary to transfer a large amount of the organization's data.

Additionally, backup, archive, and other secondary storage operations may unnecessarily preserve secondary copies of data created from primary data that has been deleted or is otherwise no longer being actively used as production data by a computing system, such as a workstation or server. Thus, secondary storage requirements may increasingly and unnecessarily bloat over time.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

BRIEF DESCRIPTION OF THE DRAWINGS

FIGS. 4A-4C are data structure diagrams illustrating data structures used by the system.

DETAILED DESCRIPTION

Figure 1:
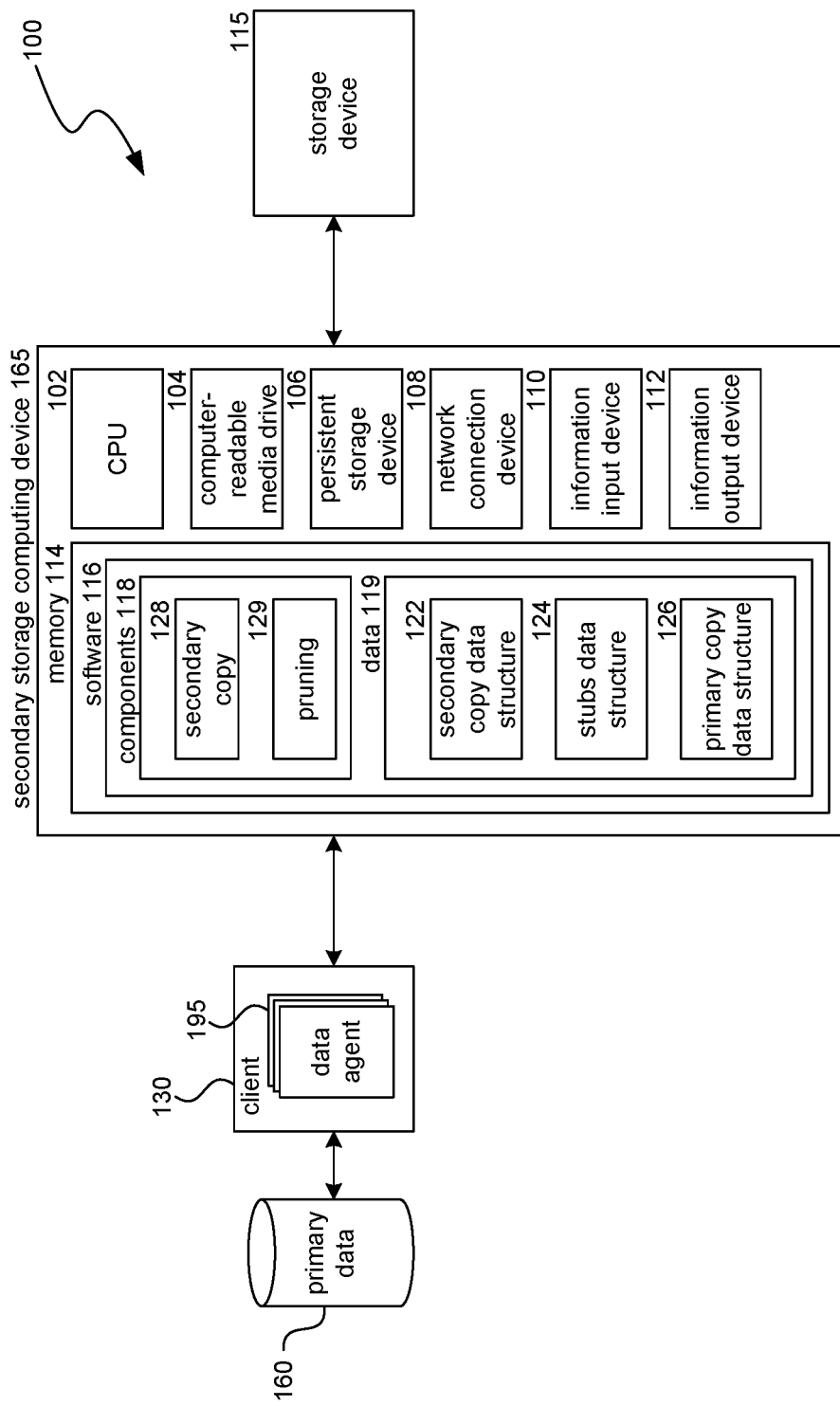
FIG. 1 is a block diagram illustrating an environment in which a system for archiving data objects using secondary copies operates.

The headings provided herein are for convenience only and do not necessarily affect the scope or meaning of the disclosure.

Overview

A software, firmware, and/or hardware system for archiving data objects using secondary copies (the "system") is disclosed. The system creates one or more secondary copies of primary copy data (e.g., production data stored by a production computing system). The primary copy data contains multiple data objects (e.g., multiple files, emails, or other logical groupings or collections of data). The system maintains a first data structure that tracks the data objects for which the system has created secondary copies and the locations of the secondary copies.

To archive data objects in the primary copy data, the system applies rules to determine which data objects are to be archived. The system then verifies that previously-created secondary copies of data objects to be archived exist and replaces the data objects with stubs, pointers or logical addresses. The system maintains a second data structure that both tracks the stubs and refers to the first data structure, thereby creating an association between the stubs and the locations of the secondary copies. Notably, the system archives data objects without creating an additional or other secondary copy of the data objects. Instead, the association between the two data structures allows stubs to point to or refer to the previously-created secondary copy of the data objects. Accordingly, the existence of the previously-created secondary copy of the data objects allows the system to forego creating an additional or other secondary copy of the data objects, thereby saving resources.

The system may also perform a process to reclaim space used to store secondary copies. To do so, the system scans or analyzes the primary copy data to identify the data objects that exist in the primary copy data and stores the results of the scan or analysis in a third data structure. The system then compares the first and third data structures (e.g., the system performs a difference of the first and third data structures) to determine which data objects in the primary copy data have been deleted. For each deleted data object, the system updates the corresponding entry in the first data structure. Then the system accesses the first data structure and determines 1) which data objects in the primary copy data have not been deleted and 2) which have been deleted, but whose deletion occurred less than a predetermined period of time ago. For each data object determined in this fashion, the system then creates, from the first secondary copy of the data object, a second secondary copy of the data object. The system can then create a new first data structure or update the existing first data structure to reflect the second secondary copies of the data objects.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Illustrative Environment

FIG. 1 is a block diagram illustrating an environment 100 in which the system may operate. The environment 100 includes one or more clients 130, one or more primary data stores 160, a secondary storage computing device 165 (alternatively referred to as a "media agent"), and one or more storage devices 115. Each of the clients 130 is a computing device, examples of which are described herein. Clients may be, as non-exclusive examples, servers, workstations, personal computers, computerized tablets, PDAs, smart phones, or other computers having social networking data, such as a Facebook data. The clients 130 are each connected to one or more associated primary data stores 160 and to the secondary storage computing device 165. The secondary storage computing device 165 is connected to the storage device 115. The primary data stores 160 and storage device 115 may each be any type of storage suitable for storing data, such as Directly-Attached Storage (DAS) such as hard disks, a Storage Area Network (SAN), e.g., a Fibre Channel SAN, an iSCSI SAN or other type of SAN, Network-Attached Storage (NAS), a tape library, or any other type of storage. The clients 130 and the secondary storage computing device 165 typically include application software to perform desired operations and an operating system on which the application software runs. The clients 130 and the secondary storage computing device 165 typically also include a file system that facilitates and controls file access by the operating system and application software. The file system facilitates access to local and remote storage devices for file or data access and storage.

The clients 130, as part of their functioning, utilize data, which includes files, directories, metadata (e.g., ACLs, descriptive metadata, and any other streams associated with the data), and other data objects, which may be stored in the primary data store 160. The data of a client 130 is generally a primary copy (e.g., a production copy). Although described as a "client" of the secondary storage computing device 165, a client 130 may in fact be a production server, such as a file server or Exchange server, which provides live production data to multiple user workstations as part of its function. Each client 130 includes a data agent 195 (described in more detail with reference to FIG. 5). During a copy, backup, archive, or other storage operation, the data agents 195 send a copy of data objects in a primary data store 160 to the secondary storage computing device 165.

The secondary storage computing device 165 includes a memory 114. The memory 114 includes software 116 incorporating components 118 and data 119 typically used by the system. The components 118 include a secondary copy component 128 that performs secondary copy operations and a pruning component 129 that performs space reclamation or pruning operations. The data 119 includes secondary copy data structure 122, stubs data structure 124, and primary copy data structure 126. The system uses the data 119 to, among other things, track data objects copied during archive and other secondary copy operations and to track data objects in primary copy data.

While items 118 and 119 are illustrated as stored in memory 114, those skilled in the art will appreciate that these items, or portions of them, may be transferred between memory 114 and a persistent storage device 106 (for example, a magnetic hard drive, a tape of a tape library, etc.) for purposes of memory management, data integrity, and/or other purposes.

The secondary storage computing device 165 further includes one or more central processing units (CPU) 102 for executing software 116, and a computer-readable media drive 104 for reading information or installing software 116 from tangible computer-readable storage media, such as a floppy disk, a CD-ROM, a DVD, a USB flash drive, and/or other tangible computer-readable storage media. The secondary storage computing device 165 also includes one or more of the following: a network connection device 108 for connecting to a network, an information input device 110 (for example, a mouse, a keyboard, etc.), and an information output device 112 (for example, a display).

Illustrative Archiving Process and Data Structures

Figure 2:
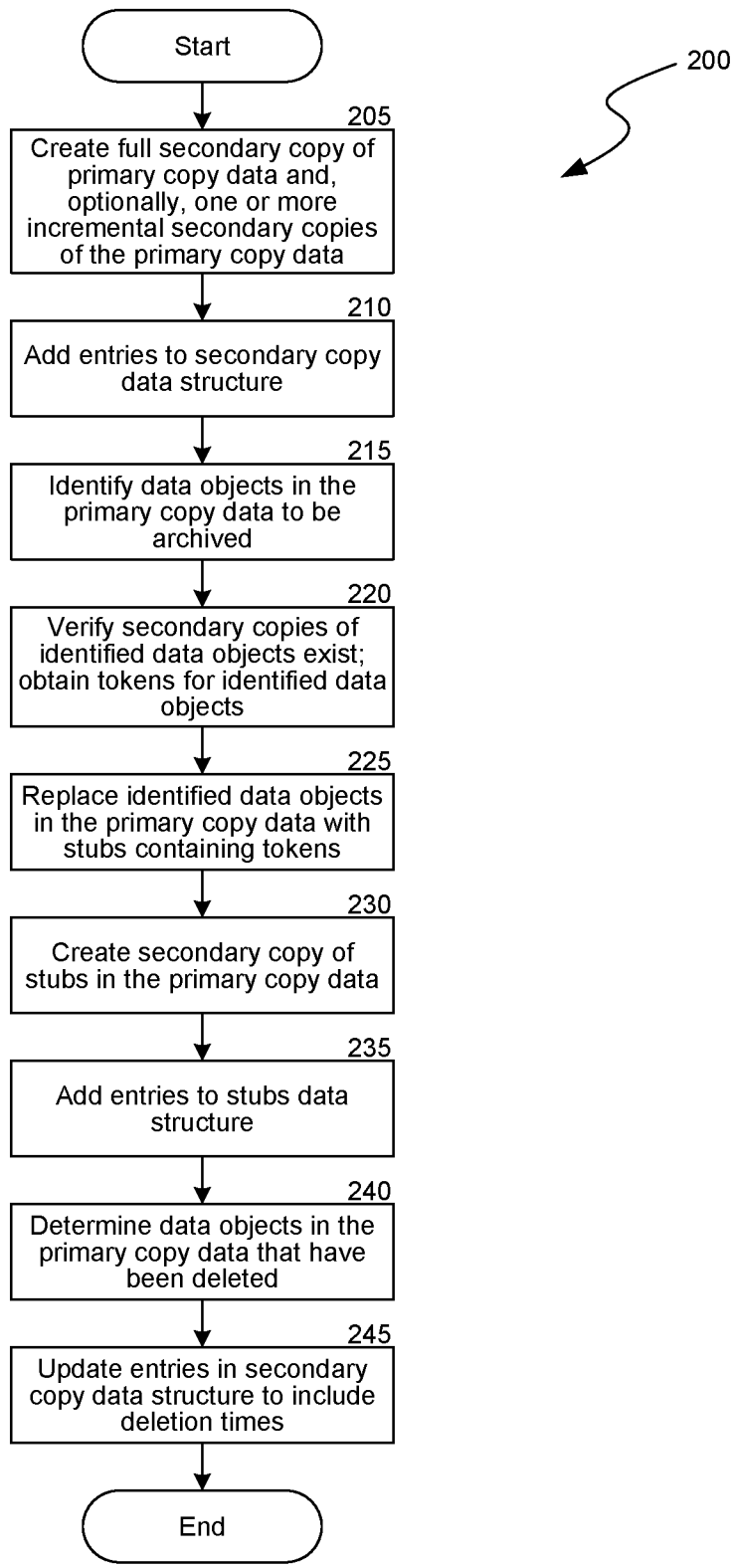
FIG. 2 is a flow diagram illustrating a process implemented by the system in connection with archiving data objects using secondary copies.

FIG. 2 is a flow diagram illustrating a process 200 implemented by the system in connection with archiving data objects using secondary copies in some examples. The process 200 begins at step 205, where the system creates a full secondary copy of the primary copy data of a client 130, by creating a secondary copy of the entire primary copy data and transferring the secondary copy to the storage device 115. The system may also create one or more incremental copies of the primary copy data by transferring only the primary copy data that has changed since the time of the full copy or a previous incremental copy. For example, the system may perform only a single full backup of all the primary copy data that is to be protected (as defined, for example, by a storage policy or other criteria) and store the full backup on the storage device 115. Thereafter, the system may then create weekly, daily, periodic, intermittent or continuous incremental backup copies of only the primary copy data that has changed since the system performed the last backup operation. In such examples, periodically the system may use one or more of the full backup, incremental backups, and/or previous synthetic full backups to generate a new synthetic full backup copy via a synthetic full operation. As part of a synthetic full backup operation, the system may process data objects that have been deleted from the primary copy of the data and remove these data objects from the synthetic full copy. In some examples, the generation of a new synthetic full backup copy or other synthetic full operation requires reading one or more previous backup copies or other types of secondary copies, rehydrating or decompressing the previous secondary copy or copies, and re-deduplicating the previous secondary copy or copies. In other examples, the generation of a new synthetic full backup copy or other synthetic operation does not require reading, rehydrating, or re-deduplicating a previous backup or other secondary copy. Instead, reference counts may be updated and metadata may be added to the synthetic full copy.

At step 210 the system adds entries to the secondary copy data structure 122. FIG. 4A is a data structure diagram illustrating the secondary copy data structure 122. The secondary copy data structure 122 contains rows, such as rows 425*a* and 425*b*, each divided into the following columns: an ID column 405 containing an identifier of a data object (e.g., a globally unique identifier—GUID), a primary copy location column 410 containing the location of the primary copy of the data object, a secondary copy location column 415 containing the location of the secondary copy of the data object, and a deletion time column 420 containing a time stamp of when the primary copy of the data object was deleted. The secondary copy data structure 122 may also include other columns that may contain additional data about data objects.

Although absolute locations for the primary copy and the secondary copy are shown in FIG. 4A, the system may additionally or alternatively use relative locations to indicate the locations of data objects in the secondary copy data structure 122. For example, the system may store secondary copies of data objects using a logical archive file and specify a relative location within the logical archive file for a secondary copy location. As another example, the system may store secondary copies of data objects on tape and specify a tape and an offset within the tape for a secondary copy location. Those of skill in the art will understand that secondary copies can be stored using varied techniques and that the system is not limited to the techniques expressly illustrated or described in this disclosure.

Moreover, although FIG. 4A illustrates entries corresponding to files in the secondary copy data structure 122, the disclosed techniques may also be used with other types of data objects, such as emails and email attachments, database or spreadsheet objects, data blocks, and other data objects stored in other data repositories. Accordingly, the disclosure is not to be construed as limited solely to files.

The system may utilize a single secondary copy data structure 122 for each client 130 (or subclient thereof) or for each set of data subject to data protection operations, which may be the data of a single client 130 or the data of multiple clients 130. Additionally or alternatively, the system may use a single secondary copy data structure 122 for multiple clients 130 or for multiple sets of data subject to data protection operations, which may be the data of a single client 130 or the data of multiple clients 130. In such a case, the secondary copy data structure 122 may contain additional columns containing data that allows for differentiation of data associated with different clients 130 or different sets of data.

In adding entries for each new copy of a data object, the system adds a new row 425 to the secondary copy data structure 122. The system may generate the identifier for each secondary copy of a data object created and, in the new row 425, add the identifier to column 405, add the primary copy location of the data object to column 410, and add the secondary copy location to column 415. The system may also store additional data as part of step 210, such as in other columns of the secondary copy data structure 122 or in other data structures.

Returning to FIG. 2, at step 215 the system identifies data objects in the primary copy data that are to be archived. For example, the system may apply one or more rules or criteria based on any combination of data object type, data object age, data object size, percentage of disk quota, remaining storage, metadata (e.g., a flag or tag indicating importance) and/or other factors. At step 220 the system verifies that a secondary copy of each data object has been made. To do so, the system may access the secondary copy data structure 122 to determine that secondary copies of the identified data objects exist. Also at step 220, the system obtains a token for each identified data object. The token represents confirmation or verification that a secondary copy of a data object was previously created, and is typically unique for each data object. At step 225, the system replaces each of the identified data objects in the primary copy data with a stub containing the token. The stub is typically a small data object that indicates, points to, or refers to the location of the secondary copy of the data object and facilitates recovery of the data object. More details as to archiving operations may be found in the commonly-assigned currently pending U.S. Patent Application Number 2008/0229037, the entirety of which is incorporated by reference herein.

At step 230 the system copies the stubs in the primary copy data to the storage device 115. At step 235 the system adds entries to the stubs data structure 124. FIG. 4B is a data structure diagram illustrating the stubs data structure 124. The stubs data structure 124 contains rows, such as rows 465a and 465b, each divided into the following columns: an ID column 455 containing the identifier of a data object (e.g., the GUID) and a token column 460 containing the token previously created or generated for the data object. The stubs data structure 124 may also include other columns that may contain additional data about data objects. The system may utilize a single stubs data structure 124 for a single data objects data structure 122, a single stubs data structure 124 for multiple data objects data structures 122, and/or multiple stubs data structures 124 for multiple data objects data structures 122.

In adding entries, the system adds a new row 465 to the stubs data structure 124. In the new row 465 the system adds the identifier that corresponds to the data object associated with the stub to column 455 and the token obtained in step 220 to column 460. The system may also store additional data as part of step 235, such as in other columns of the stubs data structure 124 or in other data structures. The entries in rows 465a and 465b indicate that the system archived the data objects identified in rows 425a and 425d, respectively, of the secondary copy data structure 122. Also in step 235 the system adds entries to the secondary copy data structure 122 for the stubs. In FIG. 4A, rows 425f and 425g correspond to the entries for the stubs.

Returning to FIG. 2, at step 240, the system determines which data objects in the primary copy data have been deleted. The system may use various techniques to determine which data objects in the primary copy data have been deleted. For example, the system may scan or analyze the primary copy data on a periodic or ad-hoc basis, and populate a data structure that contains entries for each of the data objects in the primary copy data. FIG. 4C is a data structure diagram illustrating the primary copy data structure 126. The primary copy data structure 126 (alternatively referred to as an "image map") is generally similar to the secondary copy data structure 122 but contains entries only for data objects existing in the primary copy data as of the most recent scan or analysis of the primary copy data. To determine the data objects that have been deleted, the system can compare the secondary copy data structure 122 with the primary copy data structure 126. The data objects that are in the secondary copy data structure 122 but not in the primary copy data structure 126 are the data objects that have been deleted. Additionally or alternatively, the system can use other techniques to determine when a data object in the primary copy data has been deleted, such as by receiving information from a driver or file system filter on the client 130 that detects such deletions. Additionally or alternatively, the system can predict if and when a data object in primary copy data has been deleted based upon information available to the system, such as heuristics or historical data.

Returning to FIG. 2, at step 245 the system updates the entries in the secondary copy data structure 122 corresponding to the deleted data objects to include their deletion times. The system may use the time of the last scan or analysis as the deletion times or may use the actual deletion times of the data objects. After step 245, the process 200 concludes.

Those of skill in the art will understand that the process 200 may be varied while still coming within the general scope of the process 200. For example, if the system cannot verify that a secondary copy of the data object was previously created, the system may not archive the data object in the primary copy data. Alternatively, in such a case, the system may create a secondary copy of the data object and add an entry to the secondary copy data structure 122 before archiving the data object. Alternatively, the system may flag the data object for later archiving after the system has created a secondary copy of the data object at a later time. The system may perform other variations of the process 200.

Illustrative Space Reclamation Process

Figure 3:
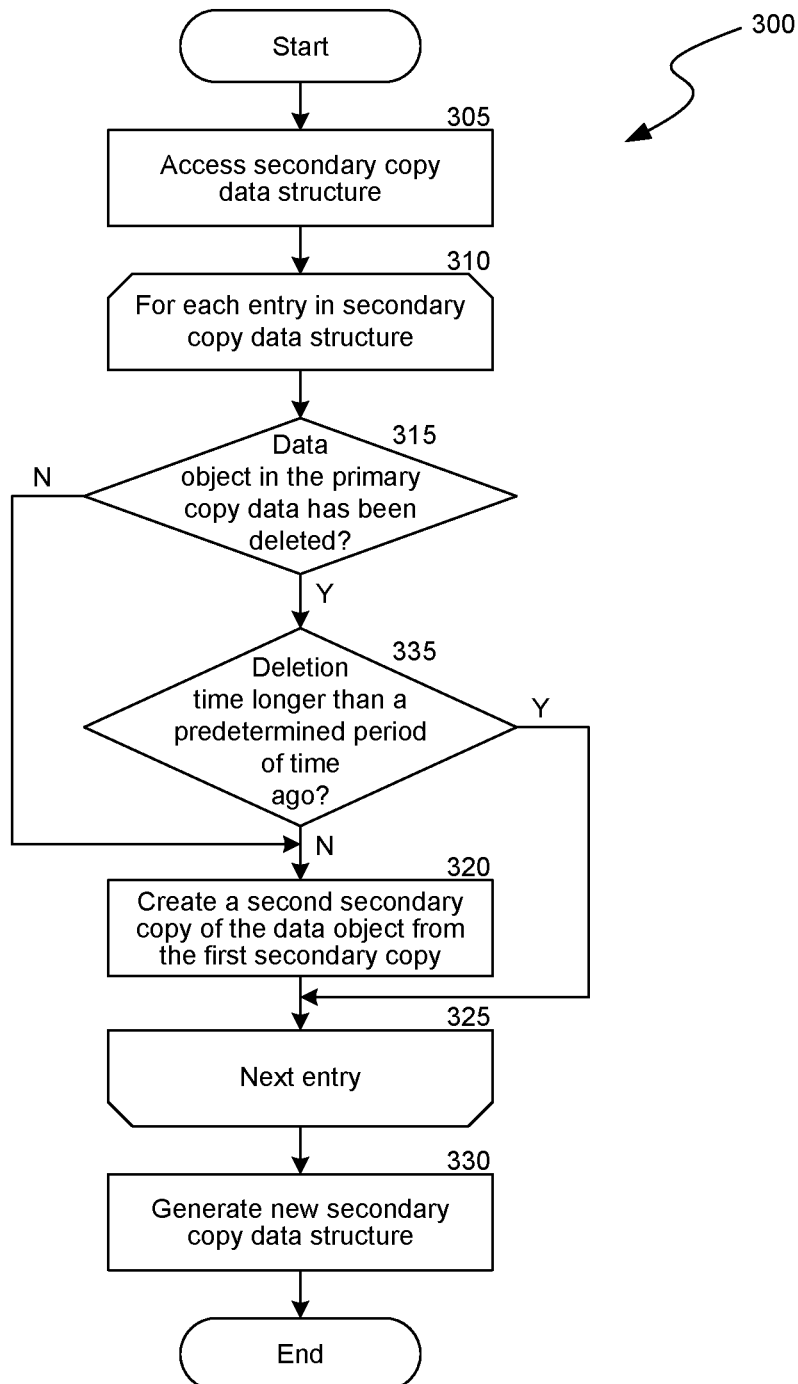
FIG. 3 is a flow diagram illustrating a process implemented by the system in connection with reclaiming space used to store secondary copies.

FIG. 3 is a flow diagram illustrating a process 300 implemented by the system in connection with reclaiming space used to store secondary copies in some examples (alternatively referred to as "pruning data"). The process 300 begins at step 305 where the system accesses the secondary copy data structure 122. At step 310, the system begins iterating through each entry in the secondary copy data structure 122. At step 315, the system determines whether the data object in the primary copy data identified in the entry has been deleted. If not, the process 300 continues to step 320, where the system creates a second secondary copy of the data object from the first secondary copy, and may delete the first secondary copy either immediately or at a later time, e.g., at the conclusion of the process 300. For example, the data object identified in row 425a of the secondary copy data structure 122, because it has no deletion time, has not been deleted. The system can create the second secondary copy of the data object on the same media as the first secondary copy or on different media (e.g., if the first secondary copy is stored on disk, the system can create the second secondary copy on another disk, on tape, and/or on a cloud storage service).

If the system determines that the data object in the primary copy data has been deleted, the process 300 continues to step 335, where the system determines whether the deletion time of the data object is longer ago than a predetermined, configurable, period of time (e.g., longer than one year ago). For example, the data object identified in row 425b, because it has a deletion time, has been deleted. If not (e.g., the data object was deleted less than a year ago), the process 300 continues to step 320, described above. If the deletion time of the data object is longer ago than the predetermined period of time, the process 300 skips step 320 (skips the step of creating a second secondary copy of the data object). Additionally, the system may delete the secondary copy of the long-deleted data object either immediately or at a later time, e.g., at the conclusion of the process 300. For example, if the system is performing the process 300 on Sep. 30, 2010 and the predetermined period of time is 90 days, then the system would not create a second secondary copy of the data object identified in row 425b because it was deleted on Jun. 25, 2010. However, the system would create a second secondary copy of the data object identified in row 425e because it was deleted on Jul. 10, 2010, which is less than 90 days before Sep. 30, 2010.

The predetermined period of time acts as a timer that starts when a data object in primary copy data has been deleted (or when the system detects the deletion). After the timer has expired, the system no longer needs to store the secondary copy of the data object. Storing the secondary copy of the data object for a period of time past the deletion time of the data object in primary copy data allows the secondary copy of the data object to be retrieved or recalled if, for example, the data object needed to be recovered to satisfy an e-discovery or legal hold request. The predetermined period of time can be set according to archival rules or storage policies (e.g., to comply with e-discovery or other requirements). The predetermined period may vary based on the type of data object. For example, certain types of data objects (e.g., financial data) may have a longer predetermined period of time than other types of data (e.g., personal emails). The system may determine the data type by content indexing the data objects or by accessing data classifications of the data objects.

Moreover, the predetermined period of time allows for data objects to be recovered in the case of accidental or unintended deletion or in case data objects appear to have been deleted. For example, if a user accidentally or unintentionally deletes a data object in primary copy data, the user has until at least the expiration of the predetermined period of time to discover the accidental or unintended deletion and request that the deleted data object be recovered. As another example, if a volume containing a set of data objects becomes unmounted, upon scanning or analyzing the primary copy data, the system would determine that the data objects have been deleted and accordingly update the corresponding entries in the secondary copy data structure 122. As long as the volume is remounted prior to the predetermined periods of time, the system will not delete the secondary copies of the data objects. When the volume is remounted, the system can recognize that the data objects are already tracked in the secondary copy data structure 122 and remove the deletion times from the corresponding entries in the secondary copy data structure 122.

At step 325 the system moves to the next entry in the secondary copy data structure 122 and performs the above steps with respect to the data object identified in the next entry. After the system has iterated through all of the entries in the secondary copy data structure 122, the process 300 continues at step 330, where the system generates a new secondary copy data structure 122 that includes entries corresponding to only the data objects for which the system created second secondary copies. The new secondary copy data structure 122 also includes the locations of the second secondary copies of the data objects. At step 330, the system may also delete the old secondary copy data structure. After step 330 the process 300 concludes.

Those of skill in the art will understand that the process 300 may be varied while still coming within the general scope of the process 300. For example, to prune data, instead of creating second secondary copies of data objects from the first secondary copies of data objects, the system may instead delete certain first secondary copies of data objects, e.g., those data objects having a deletion time longer ago than a predetermined, configurable, period of time. Instead of or in addition to creating a new secondary copy data structure 122, the system may delete rows from the existing secondary copy data structure 122 corresponding to the data objects having a deletion time longer ago than a predetermined, configurable, period of time, for which the system did not create second secondary copies. The system may also update the secondary copy locations of the rows corresponding to the data objects for which the system did create second secondary copies. As another example, instead of pruning a secondary copy of a data object in response to the deletion of the data object in the primary copy data, the system may additionally or alternatively prune a secondary copy of a data object when other criteria are met, such as criteria relating to the creation time, modification time, size, file type, or other characteristics of the data object in the primary copy data. The system may perform other variations of the process 300.

One advantage of the techniques described herein is that the system can avoid creating additional secondary copies of data objects in primary copy data when archiving the data objects. Instead, the system can use the associations between the secondary copy data structure 122 and the stubs data structure 124 to point or refer stubs to the previously-created secondary copy of the data objects. Accordingly, the existence of the previously-created secondary copy of the data objects allows the system to forego creating another secondary copy of the data objects when archiving the data objects, thereby saving resources. Since the system only transfers a data object from primary storage to secondary storage once instead of twice (e.g., once for backup, once for archive), it may save network bandwidth and processing capacity. Moreover, since the system often transfers a set of data objects from primary storage to secondary storage during the course of several incremental secondary copy operations (e.g., during several incremental backup operations), the system may avoid a single, large data transfer when it later archives the same set of data objects. Instead, the set of data objects in primary storage may simply be replaced with stubs when the time comes to archive them. As another example, since the system only stores a single copy of each data object in secondary storage, instead of two copies, the total secondary storage capacity needed by the system may be reduced.

Yet another advantage of the techniques described herein is that the system can use a common set of data structures to track both archive operations and other secondary copy operations, thereby potentially simplifying the tracking of both types of operations. Another advantage is that since only one secondary copy of a data object needs to be created, other ancillary processes such as content-indexing, encryption, compression, data classification and/or deduplication or single-instancing of the secondary copy need only be performed once on the single secondary copy, instead of multiple times on each secondary copy.

Another advantage of the techniques described herein is that the secondary copy data structure 122 can be updated to account for moved or transferred secondary copies (e.g., data objects moved to another tier of secondary storage). Accordingly, the stub of a data object whose secondary copy was moved or transferred can still be used to locate and recall the moved or transferred data object.

Still another advantage of the techniques described herein is that by pruning data, e.g., in response to the deletion of corresponding primary data, the secondary storage capacity requirements are reduced.

Suitable Data Storage System

Figure 5:
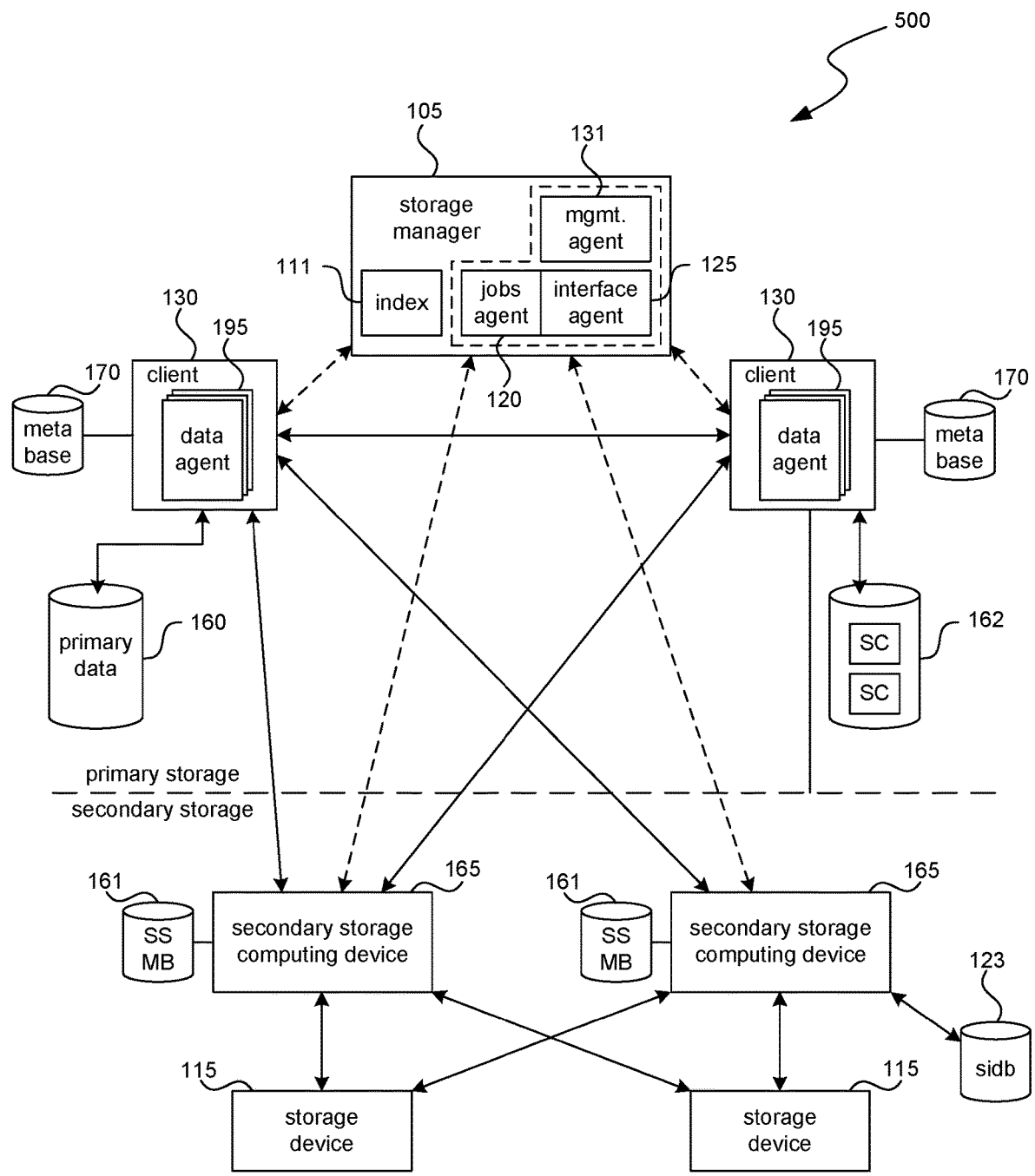
FIG. 5 is a block diagram illustrating a data storage system in which the system operates.

FIG. 5 illustrates an example of one arrangement of resources in a computing network, comprising a data storage system 500. The resources in the data storage system 500 may employ the processes and techniques described herein. The system 500 includes a storage manager 105, one or more data agents 195, one or more secondary storage computing devices 165, one or more storage devices 115, one or more computing devices 130 (called clients 130), one or more data or information stores 160 and 162, a single instancing database 123, an index 111, a jobs agent 120, an interface agent 125, and a management agent 131. The system 500 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 500 may also represent a modular storage system such as the CommVault Simpana system, also available from CommVault Systems, Inc.

The system 500 may generally include combinations of hardware and software components associated with performing storage operations on electronic data. Storage operations include copying, backing up, creating, storing, retrieving, and/or migrating primary storage data (e.g., data stores 160 and/or 162) and secondary storage data (which may include, for example, snapshot copies, backup copies, hierarchical storage management (HSM) copies, archive copies, and other types of copies of electronic data stored on storage devices 115). The system 500 may provide one or more integrated management consoles for users or system processes to interface with in order to perform certain storage operations on electronic data as further described herein. Such integrated management consoles may be displayed at a central control system or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a deduplication, single instancing or variable instancing policy to apply to the data, and/or other criteria relating to a storage operation. For example, a storage policy may indicate that certain data is to be stored in the storage device 115, retained for a specified period of time before being aged to another tier of secondary storage, copied to the storage device 115 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. In some cases, the storage policy includes information generally specified by the schedule policy. (Put another way, the storage policy includes the schedule policy.) A "retention policy" may specify how long data is to be retained at specific tiers of storage or what criteria must be met before data may be pruned or moved from one tier of storage to another tier of storage. Storage policies, schedule policies and/or retention policies may be stored in a database of the storage manager 105, to archive media as metadata for use in restore operations or other storage operations, or to other locations or components of the system 500.

The system 500 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 105 (or management agent 131), a secondary storage computing device 165, a client 130, and other components as described herein. A second storage operation cell may contain the same or similar physical components; however, it may be configured to perform a second type of storage operations, such as storage resource management (SRM) operations, and may include monitoring a primary data copy or performing other known SRM operations.

Thus, as can be seen from the above, although the first and second storage operation cells are logically distinct entities configured to perform different management functions (i.e., HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 165, client 130, or other network device connected to a primary storage volume, while a storage operation cell configured to perform HSM tasks may instead include a secondary storage computing device 165, client 130, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 105 that coordinates storage operations via the same secondary storage computing devices 165 and storage devices 115. This "overlapping" configuration allows storage resources to be accessed by more than one storage manager 105, such that multiple paths exist to each storage device 115 facilitating failover, load balancing, and promoting robust data access via alternative routes.

Alternatively or additionally, the same storage manager 105 may control two or more storage operation cells (whether or not each storage operation cell has its own dedicated storage manager 105). Moreover, in certain embodiments, the extent or type of overlap may be user-defined (through a control console) or may be automatically configured to optimize data storage and/or retrieval.

Data agent 195 may be a software module or part of a software module that is generally responsible for performing storage operations on the data of the client 130 stored in data store 160/162 or other memory location. Each client 130 may have at least one data agent 195 and the system 500 can support multiple clients 130. Data agent 195 may be distributed between client 130 and storage manager 105 (and any other intermediate components), or it may be deployed from a remote location or its functions approximated by a remote process that performs some or all of the functions of data agent 195.

The overall system 500 may employ multiple data agents 195, each of which may perform storage operations on data associated with a different application. For example, different individual data agents 195 may be designed to handle Microsoft Exchange data, UNIX data, Lotus Notes data, Microsoft Windows file system data, Microsoft Active Directory Objects data, and other types of data known in the art. Other embodiments may employ one or more generic data agents 195 that can handle and process multiple data types rather than using the specialized data agents described above.

If a client 130 has two or more types of data, one data agent 195 may be required for each data type to perform storage operations on the data of the client 130. For example, to back up, migrate, and restore all the data on a Microsoft Exchange server, the client 130 may use one Microsoft Exchange Mailbox data agent 195 to back up the Exchange mailboxes, one Microsoft Exchange 2000 Database data agent 195 to back up the Exchange databases, one Microsoft Exchange 2000 Public Folder data agent 195 to back up the Exchange 2000 Public Folders, and one Microsoft Windows File System data agent 195 to back up the file system of the client 130. These data agents 195 would be treated as four separate data agents 195 by the system even though they reside on the same client 130.

Alternatively, the overall system 500 may use one or more generic data agents 195, each of which may be capable of handling two or more data types. For example, one generic data agent 195 may be used to back up, migrate and restore Microsoft Exchange 2000 Mailbox data and Microsoft Exchange Database data while another generic data agent 195 may handle Microsoft Exchange Public Folder data and Microsoft Windows File System data, etc.

Data agents 195 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 105 or secondary storage computing devices 165. As used herein, a file or a data object refers to any collection or grouping of bytes of data that can be viewed as one or more logical units.

Generally speaking, storage manager 105 may be a software module or other application that coordinates and controls storage operations performed by the system 500. Storage manager 105 may communicate with some or all elements of the system 500, including clients 130, data agents 195, secondary storage computing devices 165, and storage devices 115, to initiate and manage storage operations (e.g., backups, migrations, data recovery operations, etc.).

Storage manager 105 may include a jobs agent 120 that monitors the status of some or all storage operations previously performed, currently being performed, or scheduled to be performed by the system 500. (One or more storage operations are alternatively referred to herein as a "job" or "jobs.") Jobs agent 120 may be communicatively coupled to an interface agent 125 (e.g., a software module or application). Interface agent 125 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 125, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 115).

Storage manager 105 may also include a management agent 131 that is typically implemented as a software module or application program. In general, management agent 131 provides an interface that allows various management agents 131 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 125. This allows each storage operation cell to send and receive certain pertinent information from other storage operation cells, including status information, routing information, information regarding capacity and utilization, etc. These communications paths may also be used to convey information and instructions regarding storage operations.

For example, a management agent 131 in a first storage operation cell may communicate with a management agent 131 in a second storage operation cell regarding the status of storage operations in the second storage operation cell. Another illustrative example includes the case where a management agent 131 in a first storage operation cell communicates with a management agent 131 in a second storage operation cell to control storage manager 105 (and other components) of the second storage operation cell via management agent 131 contained in storage manager 105.

Another illustrative example is the case where management agent 131 in a first storage operation cell communicates directly with and controls the components in a second storage operation cell and bypasses the storage manager 105 in the second storage operation cell. If desired, storage operation cells can also be organized hierarchically such that hierarchically superior cells control or pass information to hierarchically subordinate cells or vice versa.

Storage manager 105 may also maintain an index, a database, or other data structure 111. The data stored in database 111 may be used to indicate logical associations between components of the system, user preferences, management tasks, media containerization and data storage information or other useful data. For example, the storage manager 105 may use data from database 111 to track logical associations between secondary storage computing device 165 and storage devices 115 (or movement of data as containerized from primary to secondary storage).

Generally speaking, the secondary storage computing device 165, which may also be referred to as a media agent, may be implemented as a software module that conveys data, as directed by storage manager 105, between a client 130 and one or more storage devices 115 such as a tape library, a magnetic media storage device, an optical media storage device, or any other suitable storage device. In one embodiment, secondary storage computing device 165 may be communicatively coupled to and control a storage device 115. A secondary storage computing device 165 may be considered to be associated with a particular storage device 115 if that secondary storage computing device 165 is capable of routing and storing data to that particular storage device 115.

In operation, a secondary storage computing device 165 associated with a particular storage device 115 may instruct the storage device to use a robotic arm or other retrieval means to load or eject a certain storage media, and to subsequently archive, migrate, or restore data to or from that media. Secondary storage computing device 165 may communicate with a storage device 115 via a suitable communications path such as a SCSI or Fibre Channel communications link. In some embodiments, the storage device 115 may be communicatively coupled to the storage manager 105 via a SAN.

Each secondary storage computing device 165 may maintain an index, a database, or other data structure 161 that may store index data generated during storage operations for secondary storage (SS) as described herein, including creating a metabase (MB). For example, performing storage operations on Microsoft Exchange data may generate index data. Such index data provides a secondary storage computing device 165 or other external device with a fast and efficient mechanism for locating data stored or backed up. Thus, a secondary storage computing device index 161, or a database 111 of a storage manager 105, may store data associating a client 130 with a particular secondary storage computing device 165 or storage device 115, for example, as specified in a storage policy, while a database or other data structure in secondary storage computing device 165 may indicate where specifically the data of the client 130 is stored in storage device 115, what specific files were stored, and other information associated with storage of the data of the client 130. In some embodiments, such index data may be stored along with the data backed up in a storage device 115, with an additional copy of the index data written to index cache in a secondary storage device. Thus the data is readily available for use in storage operations and other activities without having to be first retrieved from the storage device 115.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 115. In some embodiments, the cached information may include information regarding format or containerization of archives or other files stored on storage device 115.

One or more of the secondary storage computing devices 165 may also maintain one or more single instance databases 123. Single instancing (alternatively called data deduplication) generally refers to storing in secondary storage only a single instance of each data object (or data block) in a set of data (e.g., primary data). More details as to single instancing may be found in one or more of the following commonly-assigned U.S. patent applications: 1) U.S. patent application Ser. No. 11/269,512 (entitled SYSTEM AND METHOD TO SUPPORT SINGLE INSTANCE STORAGE OPERATIONS); 2) U.S. patent application Ser. No. 12/145,347 (entitled APPLICATION-AWARE AND REMOTE SINGLE INSTANCE DATA MANAGEMENT); or 3) U.S. patent application Ser. No. 12/145,342 (entitled APPLICATION-AWARE AND REMOTE SINGLE INSTANCE DATA MANAGEMENT), 4) U.S. patent application Ser. No. 11/963,623 (entitled SYSTEM AND METHOD FOR STORING REDUNDANT INFORMATION); 5) U.S. patent application Ser. No. 11/950,376 (entitled SYSTEMS AND METHODS FOR CREATING COPIES OF DATA SUCH AS ARCHIVE COPIES); or 6) U.S. Pat App. No. 61/100,686 (entitled SYSTEMS AND METHODS FOR MANAGING SINGLE INSTANCING DATA), each of which is incorporated by reference herein in its entirety.

In some examples, the secondary storage computing devices 165 maintain one or more variable instance databases. Variable instancing generally refers to storing in secondary storage one or more instances, but fewer than the total number of instances, of each data block (or data object) in a set of data (e.g., primary data). More details as to variable instancing may be found in the commonly-assigned U.S. Pat. App. No. 61/164,803 (entitled STORING A VARIABLE NUMBER OF INSTANCES OF DATA OBJECTS).

In some embodiments, certain components may reside and execute on the same computer. For example, in some embodiments, a client 130 such as a data agent 195, or a storage manager 105, coordinates and directs local archiving, migration, and retrieval application functions as further described in the previously-referenced U.S. patent application Ser. No. 09/610,738. This client 130 can function independently or together with other similar clients 130.

As shown in FIG. 5, each secondary storage computing devices 165 has its own associated metabase 161. Each client 130 may also have its own associated metabase 170. However in some embodiments, each "tier" of storage, such as primary storage, secondary storage, tertiary storage, etc., may have multiple metabases or a centralized metabase, as described herein. For example, rather than a separate metabase or index associated with each client 130 in FIG. 5, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 105 or other management module may keep track of certain information that allows the storage manager 105 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 130, and can contain either all of the data of the clients 130 or a designated subset thereof. As depicted in FIG. 5, the data store 162 includes two sub-clients. For example, an administrator (or other user with the appropriate permissions; the term administrator is used herein for brevity) may find it preferable to separate email data from financial data using two different sub-clients having different storage preferences, retention criteria, etc.

Conclusion

Systems and modules described herein may comprise software, firmware, hardware, or any combination(s) of software, firmware, or hardware suitable for the purposes described herein. Software and other modules may reside on servers, workstations, personal computers, computerized tablets, PDAs, smart phones, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain examples are presented below in certain forms, the applicant contemplates the various aspects of the invention in any number of claim forms. Accordingly, the applicant reserves the right to add additional claims after filing the application to pursue such additional claim forms for other aspects of the invention.

We claim:

1. A system to create archive copies of one or more secondary copies of production data stored by a production computing system, wherein the production data contains multiple data files, the system comprising:
at least one processor; and
at least one data storage device storing a first data structure, wherein the first data structure tracks—
data identifying data files for which the system has created secondary copies, and
logical locations of the secondary copies of the data files;
wherein the secondary copies are stored on a different data storage device than the production data; and
wherein the different data storage device stores instructions to be executed by the at least one processor, the instructions comprising steps to archive data files for the production data by—
applying rules to determine that certain data files of the production data are to be archived;
verifying that previously-created secondary copies of the certain data files to be archived exist in the different data storage device,
wherein the previously-created secondary copies were created in association with another backup job,
wherein the verifying includes querying a second data structure, wherein the second data structure tracks unique tokens of the secondary copies of data files;
upon verifying that previously-created secondary copies of the certain data files to be archived exist in the different data storage device:
replacing the certain data files in the production data with stubs, pointers or logical addresses referencing the previously-created secondary copies of the certain data files;
whereby the system archives the certain data files without creating additional secondary copies, besides the previously-created secondary copies, of the certain data files.

2. The system of claim 1 wherein the rules include predetermined archival criteria related to at least one of: a data object type, a data object age, a data object size, a percentage of disk quota, remaining storage, and metadata.

3. The system of claim 1, further comprising:
providing access for users to an interface, wherein the interface permits users to perform certain storage operations, to adjust the rules, and to display or provide specific data storage information.

4. A non-transitory computer-readable storage medium whose contents cause a data storage system to perform a method for archiving multiple data objects included in primary copy data, the method comprising:
obtaining, from a client computing device, both full and incremental backup copies of the client's primary copy data;
using the received backup copies to create a secondary copy of multiple data objects included in the primary copy data;
for each of the multiple data objects for which a secondary copy was created, adding an entry for the data object to a first data structure,
wherein the entry includes an identifier associated with the data object;
after creating the secondary copy, identifying one or more of the multiple data objects that satisfy one or more predetermined archival criteria; and
for each of the identified one or more data objects:
looking up the identified data object in a second data structure using the identifier associated with the identified data object;
receiving a token for the identified data object,
wherein the token represents a verification that the secondary copy was created; and
replacing the identified data object in the primary copy data with a stub referencing the identified data object within the previously-created
secondary copy of the multiple data objects,
wherein the previously-created secondary copy was created in association with another backup job,
wherein the stub includes the token.

5. The computer-readable storage medium of claim 4 wherein the predetermined archival criteria includes at least one of: a data object type, a data object age, a data object size, a percentage of disk quota, remaining storage, and metadata.

6. The computer-readable storage medium of claim 4 wherein the method further comprises:
receiving information regarding a first data object included in the primary copy data from a driver or file system that detects deletions;
using the received information to determine that the first data object has been deleted from the primary copy data and a corresponding deletion time; and
in response to determining that the deletion time is more than a predetermined period of time ago, deleting the secondary copy of the first data object.

7. The computer-readable storage medium of claim 6 wherein the predetermined period of time is determined at least in part by an object type of the first data object.

8. The computer-readable storage medium of claim 6 wherein the predetermined period of time is determined by a storage policy.

9. A computer-implemented method for managing backup and archiving of information in an information management system, wherein the information management system includes first and second data storage systems, the computer-implemented method comprising:
scanning a first data storage system,
wherein the first storage system includes primary copies of data objects, and
wherein the scanning includes gathering metadata from the primary copies;
on a second, different data storage system, creating corresponding secondary copies of the primary copies of the data objects,
creating a database of the gathered metadata; and
when the primary copies of the data objects meet one or more archiving conditions, generating corresponding tokens for the primary copies of the data objects, verifying that previously-created secondary copies of the primary copies of the data objects exist by confirming that corresponding tokens are present in a data structure,
  wherein the data structure is separate from the database of the gathered metadata,
replacing the data objects in the primary copies with stubs,
  wherein the stubs identify logical locations of the secondary copies in the second data storage system,
  whereby certain data files are archived without creating additional secondary copies, besides the previously-created secondary copies, of the data files.

10. The method of claim 9, further comprising:
providing access for users to an interface, via consoles, with the information management system, wherein the interface displays the gathered metadata and permits users to perform certain storage operations and to display or provide specific data storage information.

11. The method of claim 9, further comprising:
if the primary copies of data objects located on the first storage system have not been modified within a predetermined time, deleting the primary copies from the first storage system; and
if the primary copies with data objects located on the first storage system have been modified within a predetermined time, modifying the data objects in the corresponding secondary copies.

12. The method of claim 9, wherein the method further comprises:
after creating stubs in the primary copy for the data objects, performing at least one of the following operations on the corresponding secondary copies: deduplication, decompression, compression, content-indexing, encryption, decryption, or data classification.

13. The method of claim 9, wherein the archiving conditions is set by an administrator at least partially based on: available storage space in the first storage system, available storage space in the second storage system, the type of data object, data object age, a percentage disk quota, or on storage policies.

14. The method of claim 9, wherein providing access further comprises:
providing an interface for users or system processors to: modify storage policy, view secondary copies, view primary copies, view copy format, view location of copies, or edit or modify primary or secondary copies.

15. The method of claim 9, further comprising:
creating a second data structure, wherein the second data structure includes locations of the primary copies having multiple data objects and the corresponding secondary copies.

16. A system for archiving data objects using secondary copies, the system comprising:
at least one processor;
at least one memory coupled to the processor;
a first software component stored on the memory that creates one or more secondary copies of primary copy data that contains multiple data objects;
a first data structure stored on the memory that contains a mapping between the data objects for which secondary copies have been created and locations of the secondary copies;
a second data structure stored on the memory that stores, for each data object for which a secondary copy had been created, a unique token; and
a second software component stored on the memory that identifies data objects to be archived, generates corresponding tokens for identified data objects to be archived, verifies that previously-created secondary copies of the identified data objects exist by confirming that corresponding tokens are present in the second data structure, and replaces the identified data objects with stubs.

17. The system of claim 16, wherein after a predetermined period of time set by a storage policy the data objects to be archived are replaced with stubs, and wherein the predetermined period of time is determined at least in part by an object type of the data objects.

18. The system of claim 16, wherein the previously-created secondary copies of the identified data objects is associated with a backup copy created at least in part by an incremental or full backup operation.

19. The system of claim 16 wherein the second software component:
determines that a first data object included in the primary copy data satisfies predetermined criteria; and
in response to determining that the first data object satisfies the predetermined criteria, deleting the secondary copy of the first data object.

* * * * *